United States Patent
Wagner et al.

(10) Patent No.: US 10,527,158 B1
(45) Date of Patent: Jan. 7, 2020

(54) ROBUST MAGNET FIELD HOMOGENEITY AND DETECTED SIGNAL-TO-NOISE FOR TRANSMISSION PARK POSITION SENSOR APPLICATIONS

(71) Applicant: GM Global Technology Operations LLC, Detroit, MI (US)

(72) Inventors: Sean R. Wagner, Shelby Township, MI (US); Thomas A. Perry, Bruce Township, MI (US); David T. Stark, Superior Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/105,386

(22) Filed: Aug. 20, 2018

(51) Int. Cl.
*F16H 59/10* (2006.01)
*G01D 5/20* (2006.01)

(52) U.S. Cl.
CPC ............. *F16H 59/105* (2013.01); *G01D 5/20* (2013.01)

(58) Field of Classification Search
CPC ..... F16H 59/02; F16H 59/0278; F16H 59/105
See application file for complete search history.

(56) References Cited

U.S. PATENT DOCUMENTS

| | | | | |
|---|---|---|---|---|
| 8,174,256 B2* | 5/2012 | Sterling | ............... | G01R 33/091 324/207.21 |
| 2007/0063693 A1* | 3/2007 | Modest | .................. | G01D 5/147 324/207.2 |
| 2009/0115407 A1* | 5/2009 | Takigawa | .............. | F16H 59/105 324/207.21 |
| 2014/0375306 A1* | 12/2014 | Moonamkandy | ........ | G01B 7/30 324/207.2 |
| 2017/0356543 A1* | 12/2017 | Turney | ................ | F16H 59/0204 |
| 2018/0172140 A1* | 6/2018 | Liubakka | ............... | B60K 20/02 |

* cited by examiner

Primary Examiner — Edwin A Young

(57) ABSTRACT

An electronic transmission range selection (ETRS) system for a motor vehicle transmission includes an ETRS housing disposed on the transmission, the ETRS housing having a magnetic field sensor in communication with a transmission controller; and a magnetic field source including a magnet component and a high magnetic permeability component. The magnetic field source disposed on a transmission selector shaft, the magnetic field source detectable by the magnetic field sensor at a plurality of predetermined positions along a movement path of the transmission selector shaft; and the magnetic field sensor detecting magnetic flux generated by the magnetic field source, and communicating magnetic field source position information to the controller. The high magnetic permeability component homogenizes the magnetic flux generated by the magnet component and the controller generates an electronic transmission mode signal based on the magnetic field source position information.

20 Claims, 5 Drawing Sheets

ROBUST MAGNET FIELD HOMOGENEITY AND DETECTED SIGNAL-TO-NOISE FOR TRANSMISSION PARK POSITION SENSOR APPLICATIONS

INTRODUCTION

The statements in this section merely provide background information relating to the present disclosure, and may not constitute prior art.

The present disclosure generally relates to motor vehicles, and more specifically to range selection sensors of motor vehicle transmissions. Many vehicles prevent or allow operations of certain functions when a transmission of the vehicle is positioned in an out-of-park position. For example, an engine ignition system may be disabled in an out-of-park position. In order to determine if the transmission is positioned in the out-of-park position, the vehicle may be equipped with a transmission position sensor, which senses the position of one or more components of a transmission control system. The position of the transmission may be communicated to one or more vehicle controllers to either enable or disable various vehicle functions as appropriate. The range selection sensors of the motor vehicle transmission often determine positions of the transmission by interpreting magnetic field information produced by magnet materials placed strategically in the transmission. Because magnetic field information, such as magnetic field vector direction information, and the like is dependent on the physical construction and direction of magnetic polarization of the magnetic materials, the magnetic field information detected by the range selection sensors is also dependent on the construction and direction of polarization of the magnetic materials.

In some transmissions, magnetic materials are disposed on or near selector shafts. To locate the magnets on the selector shaft, the magnetic materials may be constructed with a feature shaped to accept the selector shaft. However, in instances where the magnetic materials have a substantially cylindrical orifice, over time, the magnetic materials may rotate about the shaft. Accordingly, if the direction of magnetic polarization of the magnetic materials is offset from the axis of the cylindrical orifice, the direction of the magnetic field sensed by the transmission position sensors may detect an inaccurate or erroneous position. Thus, both to decrease the potential for rotation and to decrease the potential for off-axis tilting of the direction of polarization of the magnetic field of the magnetic materials, in some examples, the substantially cylindrical bore may include a keyway or flattened section optimized to prevent rotation about the axis. Magnetic materials having low magnetic field strength may be used in range selection sensor apparatuses. However, because magnetic materials tend to be dense and heavy, it is desirable to use magnetic materials having high magnetic field strength to provide sufficient magnetic flux to the range selection sensors while reducing weight and improving fuel economy. Accordingly, in the interest of cost it is important to use magnetic materials with high magnetic field strength, and to use relatively small quantities thereof. Thus, it can be difficult to limit the rotation of the magnetic materials and the axial tilt of the magnetic field polarization of those magnetic materials to such an extent that the potential for transmission position sensors to accurately detect the position of the magnetic materials is adequately low. Even in currently used examples where keyways are used to reduce or otherwise limit the potential for rotation, during production the magnetic field orientation has been experimentally found to tilt up to about 3° axially and vary up to about 9° in either direction rotationally.

Accordingly, while current magnetic materials and range selection sensors operate for their intended purpose, there is a need in the art for magnetic materials that fit within and may be retrofitted to existing transmissions and transmission position sensor apparatuses, and which have precisely and accurately controlled magnetic field directionality, while maintaining or reducing costs of production, and increasing the accuracy and precision of measurements taken by the transmission position sensors within transmissions.

SUMMARY

According to several aspects of the present disclosure an electronic transmission range selection (ETRS) system for a motor vehicle transmission includes an ETRS housing disposed on the transmission, the ETRS housing having a magnetic field sensor in communication with a transmission controller; and a magnetic field source including a magnet component and a high magnetic permeability component. The magnetic field source disposed on a transmission selector shaft, the magnetic field source detectable by the magnetic field sensor at a plurality of predetermined positions along a movement path of the transmission selector shaft; and the magnetic field sensor detecting magnetic flux generated by the magnetic field source, and communicating magnetic field source position information to the controller. The high magnetic permeability component homogenizes the magnetic flux generated by the magnet component and the controller generates an electronic transmission mode signal based on the magnetic field source position information.

In another aspect of the present disclosure the magnetic field sensor is mounted to the ETRS housing by an attachment feature.

In another aspect of the present disclosure the attachment feature comprises a bolt, a nut, a stud, a screw, a rivet or a clip.

In another aspect of the present disclosure the high magnetic permeability component comprises steel, or mu metals such as nickel-iron soft ferromagnetic alloys.

In another aspect of the present disclosure the high magnetic permeability component is disposed axially adjacent to the magnet component.

In another aspect of the present disclosure the ETRS system further includes a flux concentrator plate disposed proximate the magnetic field sensor and concentrating magnetic flux from the magnetic field source on the magnetic field sensor.

In another aspect of the present disclosure the magnet component is substantially cylindrical and has a first axial height, a first internal diameter sized to fit around the transmission selector shaft, and a first external diameter sized to fit within a portion of the housing.

In another aspect of the present disclosure the high magnetic permeability component includes at least one attachment feature and a substantially cylindrical plate, the substantially cylindrical plate having a second axial height, a second internal diameter larger than or equal to the first internal diameter, and a second external diameter smaller than or equal to the first external diameter.

In another aspect of the present disclosure the first axial height is between about 1 and about 7 times the second axial height.

In another aspect of the present disclosure the first axial height is between about 1 and about 3 times the second axial height.

In another aspect of the present disclosure the first axial height is between about 1 and about 2 times the second axial height.

In another aspect of the present disclosure in combination the first axial height and the second axial height are about 4 mm.

In another aspect of the present disclosure an electronic transmission range selection (ETRS) system for a motor vehicle transmission includes an ETRS housing disposed on the motor vehicle transmission, the ETRS housing having a magnetic field sensor in communication with a transmission controller, the magnetic field sensor mounted to the ETRS housing by an attachment feature. The ETRS system further includes a magnetic field source including a magnet component and a high magnetic permeability component, the high magnetic permeability component including steel, or mu metal such as nickel-iron soft ferromagnetic alloys, the magnetic field source disposed on a transmission selector shaft, the magnetic field source detectable by the magnetic field sensor at a plurality of predetermined positions along a movement path of the transmission selector shaft. The high magnetic permeability component homogenizes the magnetic flux generated by the magnet, the magnetic field sensor detects magnetic flux generated by the magnetic field source, and communicates magnetic field source position information to the controller, and the controller generates an electronic transmission mode signal based on the magnetic field source position information.

In another aspect of the present disclosure the high magnetic permeability component is disposed axially adjacent to the magnet component.

In another aspect of the present disclosure the ETRS system further includes a flux concentrator plate disposed proximate the magnetic field sensor and concentrating magnetic flux from the magnetic field source on the magnetic field sensor.

In another aspect of the present disclosure the magnet component is substantially cylindrical and has a first axial height, a first internal diameter sized to fit around the transmission selector shaft, and a first external diameter sized to fit within a portion of the housing.

In another aspect of the present disclosure the high magnetic permeability component includes at least one of the attachment feature and a substantially cylindrical plate, the substantially cylindrical plate having a second axial height, a second internal diameter larger than or equal to the first internal diameter, and a second external diameter smaller than or equal to the first external diameter.

In another aspect of the present disclosure the first axial height is selected from a group consisting of: between about 1 and about 7 times the second axial height, between about 1 and about 3 times the second axial height, and between 1 and about 2 times the second axial height.

In another aspect of the present disclosure in combination the first axial height and the second axial height are a maximum of about 4 mm.

In another aspect of the present disclosure an electronic transmission range selection (ETRS) system for a motor vehicle transmission includes an ETRS housing disposed on the motor vehicle transmission, the ETRS housing having a magnetic field sensor in communication with a transmission controller, the magnetic field sensor mounted to the ETRS housing by an attachment feature. The ETRS system further includes a magnetic field source having a magnet component comprising Samarium Cobalt (SmCo), Alnico, Ceramic, Ferrite, Neodymium Iron Boron magnetic materials and a high magnetic permeability component comprising steel or mu metals such as nickel-iron soft ferromagnetic alloys, the magnetic field source disposed on a transmission selector shaft, the magnetic field source detectable by the magnetic field sensor at a plurality of predetermined positions along a movement path of the transmission selector shaft. The ETRS system further includes a flux concentrator plate disposed proximate the magnetic field sensor and concentrating magnetic flux generated by the magnetic field source on the magnetic field sensor. The magnet component is substantially cylindrical and has a first axial height, a first internal diameter sized to fit around the transmission selector shaft, and a first external diameter sized to fit within a portion of the housing, and wherein the high magnetic permeability component comprises a substantially cylindrical plate, the substantially cylindrical plate having a second axial height, a second internal diameter larger than or equal to the first internal diameter, and a second external diameter smaller than or equal to the first external diameter, the magnet component having a first axial height and the high magnetic permeability material having a second axial height, the high magnetic permeability component disposed axially adjacent to the magnet component and the first and second axial heights having a combined axial height of about 4 mm, the high magnetic permeability component homogenizing the magnetic flux generated by the magnet component, the magnetic field sensor detects the magnetic flux generated by the magnetic field source, and communicates magnetic field source position information to the controller, and the controller generates an electronic transmission mode signal based on the magnetic field source position information.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
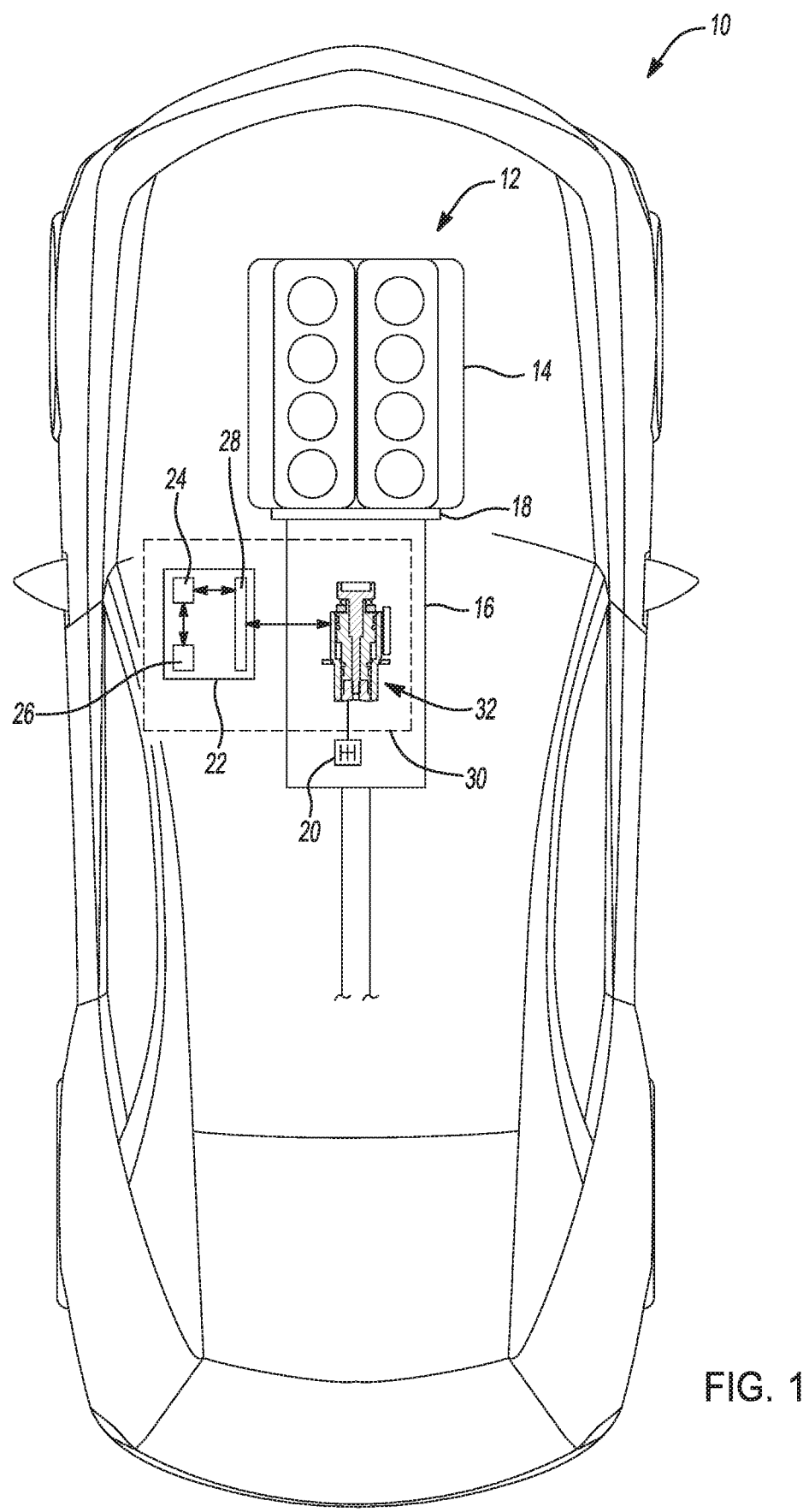
FIG. 1 is an environmental view of a motor vehicle equipped with an transmission having an electronic transmission range selection (ETRS) system with a magnetic field source including a magnet component and a high magnetic permeability component according to an aspect of the present disclosure.

Reference will now be made in detail to several embodiments of the disclosure that are illustrated in accompanying drawings. Whenever possible, the same or similar reference numerals are used in the drawings and the description to refer to the same or like parts or steps. The drawings are in simplified form and are not to precise scale. For purposes of convenience and clarity, directional terms such as top, bottom, left, right, up, over, above, below, beneath, rear, and front, may be used with respect to the drawings. These and similar directional terms are not to be construed to limit the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises", "includes," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "disposed on," "connected to," or "coupled to" another element or layer, it may be directly on, engaged, disposed, connected or coupled to the other element or layer, or intervening elements or layers may be present. In contrast, when an element is referred to as being "directly on," "directly engaged to," "directly disposed on," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The following description is merely exemplary in nature and is not intended to limit the present disclosure, application, or uses.

The system and methodology described herein can be utilized to enhance a determination when a transmission is in a park position or in an out-of-park position. While the approach and methodology are described below with respect to vehicle applications, one of ordinary skill in the art would appreciate that an automotive application is merely exemplary, and that the concepts disclosed herein may also be applied to any other suitable systems that utilize transmissions, and more specifically, that utilize magnetic materials and magnetic field sensors to determine a position of a device component. The term "vehicle" as described herein can be construed broadly to include not only a passenger automobile, but any other vehicle including, but not limited to, rail systems, planes, off-road sport vehicles, robotic vehicles, motorcycles, trucks, sport utility vehicles (SUVs), recreational vehicles (RVs), marine vessels, aircraft, farming vehicles, construction vehicles, and the like.

Referring now to FIG. 1, a motor vehicle is shown and generally indicated by reference number 10. While the motor vehicle 10 illustrated is a car, it should be appreciated that the motor vehicle 10 may be any type of vehicle, including a car, a van, a truck, a motor home, etc. The motor vehicle 10 includes a powertrain 12 operable to convert chemical or electrical energy into vehicular motion. In several aspects, the powertrain 12 includes an engine 14 coupled to a transmission 16. The engine 14 may be an internal combustion engine (ICE) such as a spark-ignited four-stroke or two-stroke engine, a compression-ignition engine, an electrical engine, a hybrid engine, or any other type of prime mover without departing from the scope or intent of the present disclosure. The engine 14 supplies a driving torque to the transmission 16 that is transferred through the transmission 16 at varying gear ratios to drive at least one pair of wheels (not specifically shown) via a mechanical or fluid coupling 18 such as a wet or dry clutch, a torque converter, or an electric motor.

A driver interface device 20 enables a vehicle operator to select various transmission 16 range positions. The driver interface device 20 can include a lever, switches, dials, push-buttons, or any other type of input interface desired. The transmission range positions generally include, but are not necessarily limited to Park, Reverse, Neutral, and Drive (PRND) positions, as well as manual downshifts, and tap-up/tap-down capabilities via actuation of the driver interface device 20. In operation, the driver interface device 20 sends an electronic mode signal to a controller 22 based on the selected transmission 16 range.

The controller 22 is a non-generalized, electronic control device having a preprogrammed digital computer or processor 24, memory or non-transitory computer readable medium 26 used to store data such as control logic, instructions, lookup tables, etc., and a plurality of input/output peripherals or ports 28. The processor 24 is configured to execute the control logic or instructions. The controller 22 may have additional processors 24 or additional integrated circuits in communication with the processor 24, such as shift control circuits for analyzing and controlling operation of the transmission 16.

The controller 22 signals an electronic transmission range selection system (ETRS) 30 to shift the transmission 16 to the corresponding range in response to the electronic mode signal. For the purpose of clarity, the ETRS system 30 is considered to be operated in a "Park" mode when the transmission 16 is in the "Park" range and to be operating in an "Out of Park" mode when the transmission 16 is in any other of the available ranges.

Figure 2:
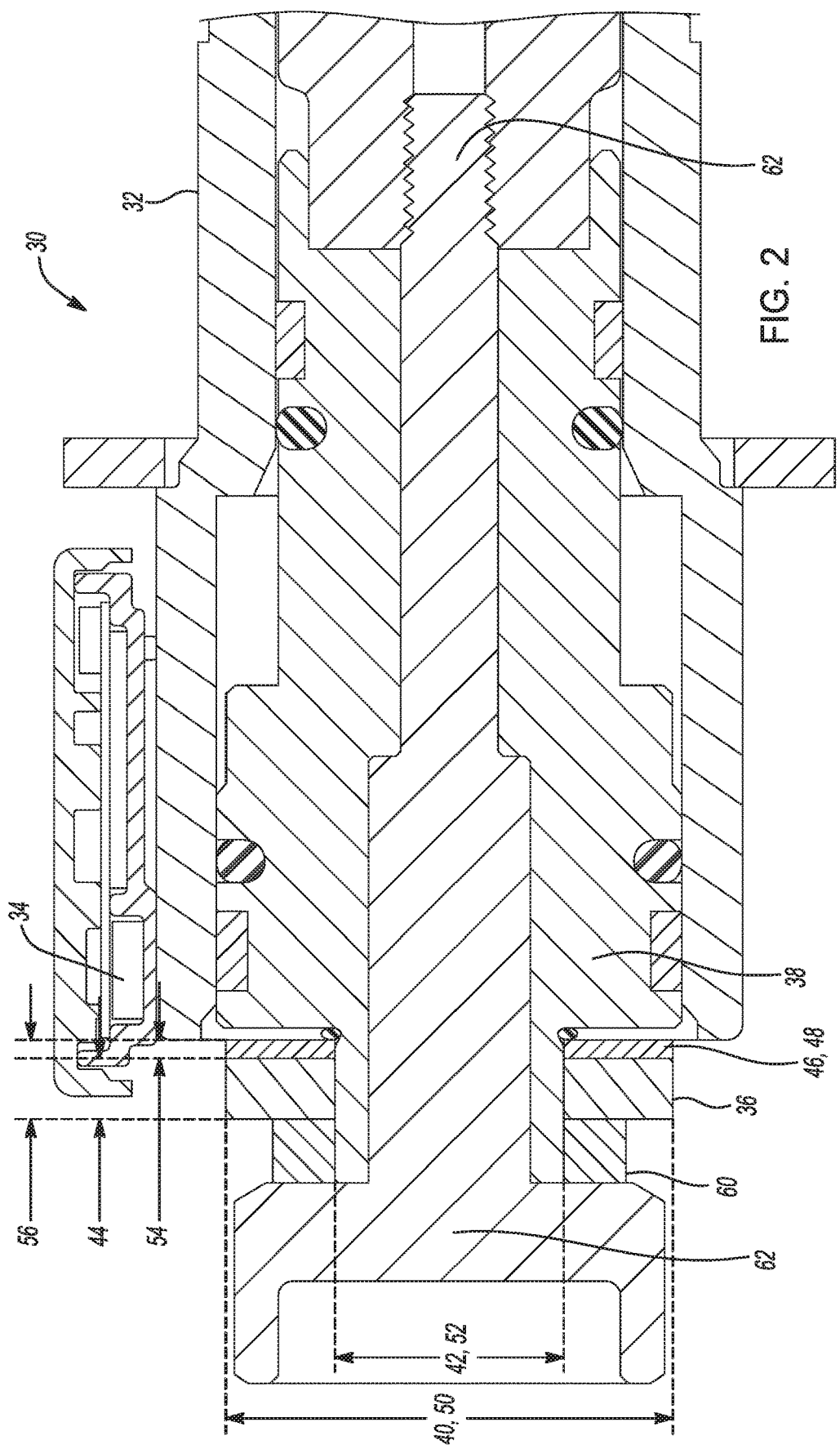
FIG. 2 is a cross-sectional view of a portion of the ETRS system according to an aspect of the present disclosure.

Referring now to FIG. 2, and with continuing reference to FIG. 1, the ETRS system 30 is an integral part of the transmission 16, and is operable to manipulate the flow of pressurized fluid to shift the transmission 16 between the available transmission ranges. The ETRS system 30 includes variety of components such as a park servo valve (not shown), a park servo valve solenoid (not shown), a forward reverse enable (FRE) valve (not shown), a hydraulic servo assembly (not shown) and other such components. The ETRS system 30 also includes a park solenoid (not shown) that prevents shifting from the out-of-park mode into the park mode in the event of a loss of pressurized fluid under specific circumstances. The ETRS system 30 components are shown supported within a housing 32 associated with the transmission 16, and which defines a valve body having a series of fluid flow passages. FIG. 2 illustrates the position of the various components when the ETRS system 30 is shifted into its park mode.

An ETRS position sensor 34 is supported within the housing 32. The ETRS position sensor 34 detects magnetic flux variation as a source magnet 36 is moved. In several aspects, the ETRS position sensor 34 is a Hall sensor, an Eddy current sensor, an anisotropic magneto-resistive (AMR) sensor, or any other such position sensor 34 capable of detecting magnetic flux variation as the magnet 36 is moved from position to position during operation of the transmission 16.

The magnet 36 is made of any of a variety of different magnetic or magnetizable materials, such as Samarium Cobalt (SmCo), Alnico, Ceramic, Ferrite, Neodymium Iron Boron (NdFeB or NIB), or the like. Depending on the application, the physical space constraints of the housing 32, and weight and cost concerns, it is desirable to use magnets 36 having as high a magnetic field strength as possible. In some aspects, the magnet 36 is a substantially cylindrical or donut-shaped magnet 36 mounted to or otherwise disposed on a selector shaft 38 of the ETRS system 30. In one particular example of the cylindrical magnet 36 has a magnet outer diameter (MOD) 40 of approximately 23 mm, and a magnet internal diameter (MID) 42 of approximately 12 mm. Additionally, the magnet 36 has magnet axial height (MAH) 44 of approximately 4 mm. In other examples, the magnet 36 may vary in MOD and MID 40, 42, and in MAH 44 depending on the space constraints of the particular application.

Because the ETRS position sensor 34 detects changes in magnetic flux as the magnet 36 is moved, it is important that the magnet 36 have a well-understood, consistent, relatively uniform, and consistently reproduceable magnetic field orientation. That is, it is important that the magnet 36 have a homogenized, consistent, and properly oriented magnetic field so that the ETRS position sensor 34 can accurately and precisely determine the position of the magnet 36 in relation to the ETRS position sensor 34 as the magnet 36 moves relative to the ETRS position sensor 34. In one example, to improve the homogeneity, consistency, and magnetic field alignment of the magnet 36 during the process in which the magnet 36 is produced, the magnet 36 is held stationary in a magnetic field generating device while a magnetic field is generated around and through the magnetic material. In some aspects, the magnetic field generating device is a coil of conductive wire through which an electrical current is passed. The magnet 36 is suspended concentrically within an interior of the coil of conductive wire, and as the electrical current is passed through the conductive wire, a magnetic field directed substantially axially through a center of the coil of conductive wire according to the right hand rule. As current passes through the coil, magnetic flux passes through and interacts with magnetizable material in the magnet 36 thereby aligning the magnetic structure of the magnet 36. However, because it is desirable to use NIB, SmCo, or other such magnetic materials having high magnetic field strength, in some aspects the magnets 36 produced by the above-referenced method and others, may tilt, rotate, or otherwise shift out of a desired alignment during production. It has been recognized experimentally that under the above-described magnetization process magnets 36 of the type described herein can exhibit an off-axis magnetic field orientation shift of up to around 3°. Measurements on actual devices show that the magnets may experience a rotational shift of up to around 9° in either direction for a total of about 18° of rotational shift. As the magnets 36 shift out of the desired alignment, the magnetic field orientation of the magnets 36 shifts. Accordingly, because the magnetic field orientation of the magnets 36 may shift during production, it is important to homogenize the magnetic field of the magnets 36 in order to mitigate and/or eliminate magnetic field orientation and concentration shifts so that the magnets 36 may be used with ETRS position sensors 34 without generating inaccuracies or erroneously sensed positions.

Figure 3:
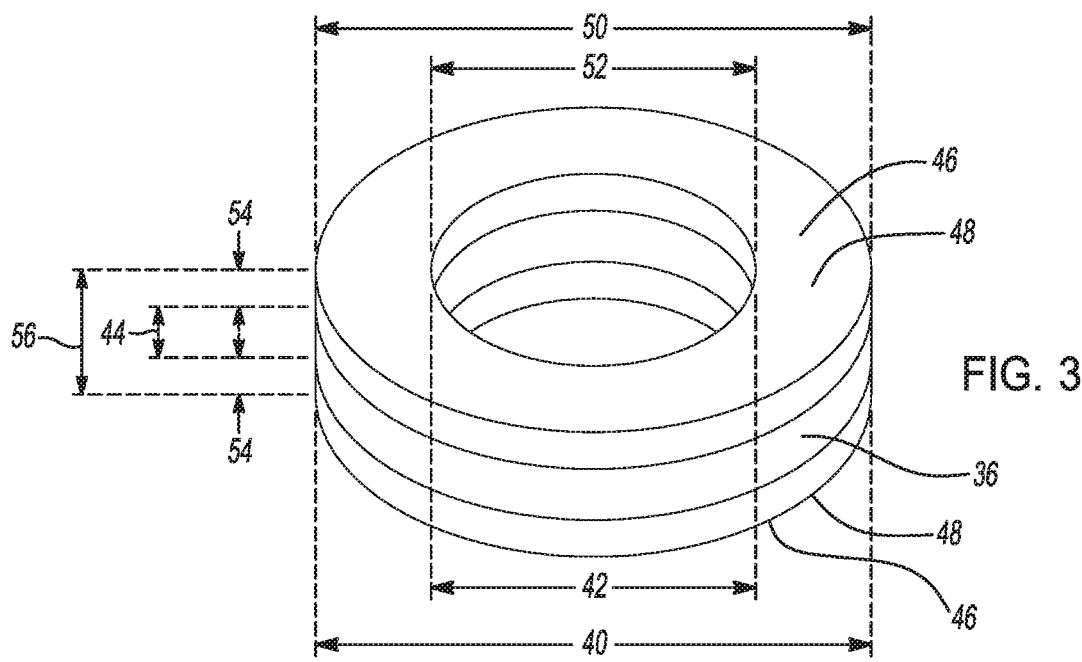
FIG. 3 is a perspective view of a magnetic field source including a magnet component and a high magnetic permeability component according to an aspect of the present disclosure.
Figure 4:
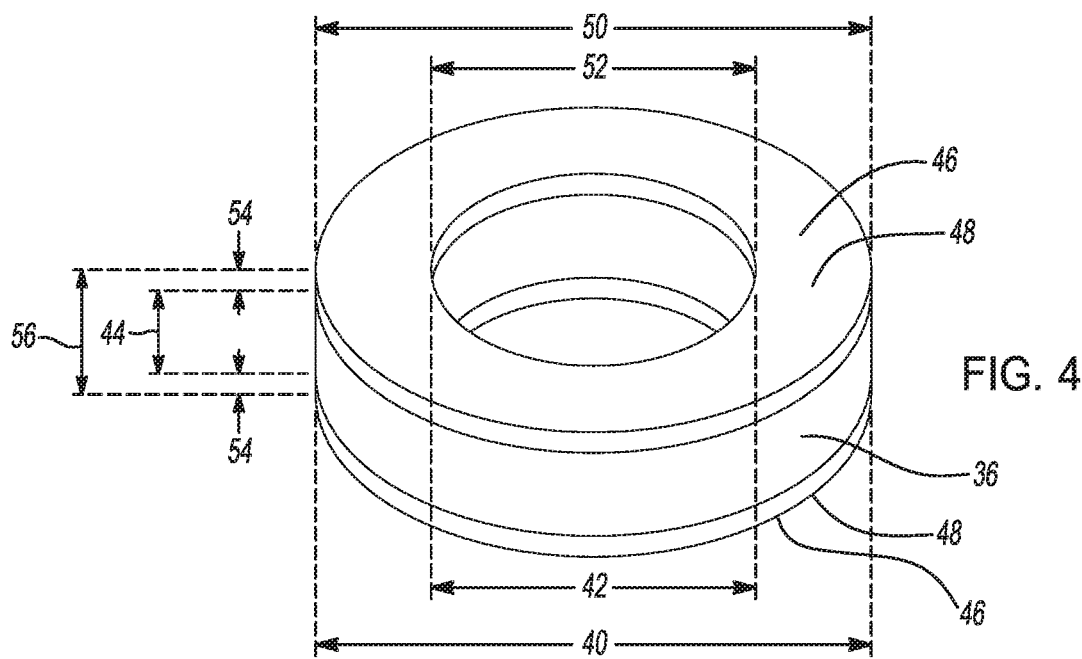
FIG. 4 is a perspective view of a magnetic field source including a magnet component and a high magnetic permeability component according to an aspect of the present disclosure.

Turning now to FIGS. 3-4, and with continuing reference to FIGS. 1 and 2 a magnet 36 having a corrected magnetic field orientation is shown in greater detail. In several aspects, in order to properly align and homogenize the magnetic fields of a substantially cylindrical magnet 36, high magnetic permeability structures 46 are overlaid onto the magnet 36. The high magnetic permeability structures 46 may be made of steel, mu metals such as nickel-iron soft ferromagnetic alloys, or the like. In some examples, the high magnetic permeability structures 46 are cylindrical disks or washers 48. The washers 48 have a washer outer diameter (WOD) 50 of no more than the MOD 40, and a washer inner diameter (WID) 52 of no less than the MID 42. The washers 48 also have a washer axial height (WAH) 54. When high magnetic permeability structures 46 are introduced in front of and/or behind the magnet 36, the homogeneity of the magnetic field of the magnet 36 is dramatically improved. That is, manufacturing defects or shifts in alignment of the magnetic field of the magnet 36 essentially and functionally disappear. However, given the space constraints of preexisting ETRS systems 30, in order to retrofit a magnet 36 in combination with high magnetic permeability structures 46 to existing ETRS systems 30, the magnet 36 and high magnetic permeability structures 46 need to fit within the same volume within the ETRS systems 30 as the magnet 36 originally would have occupied. Accordingly, the improvement of magnetic field homogeneity of the magnets 36 has to be balanced against the space constraints of a given ETRS system 30.

Figure 5:
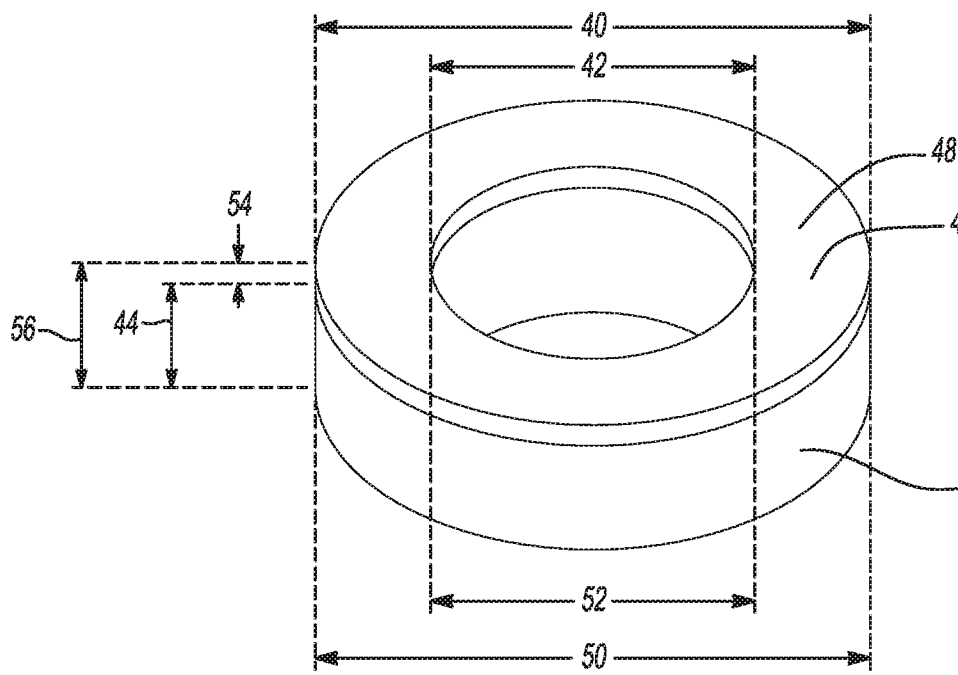
FIG. 5 is a perspective view of a magnetic field source including a magnet component and a high magnetic permeability component according to an aspect of the present disclosure.

In FIG. 3, a first example of the washers 48 used in combination with the magnet 36 is shown. In the first example, the washers 48 each have a WAH 54 of approximately 1 mm, and the MAH 44 is approximately 2 mm, and the washers 48 sandwich the magnet 36. Thus, in combination, the washers 48 and the magnet 36 have a total axial height (TAH) 56 of approximately 4 mm. In FIG. 4, a second example of the washers 48 used in combination with the magnet 36 is shown. In the second example, the washers 48 sandwich the magnet 36 and each of the washers 48 has a WAH 54 of approximately 0.5 mm, and the magnet 36 has an MAH 44 of approximately 3 mm. Thus, in combination, the washers 48 and the magnet 36 have a TAH 56 of approximately 4 mm. In FIG. 5, a third example of a single washer 48 used in combination with the magnet 36 is shown. In the third example, the single washer has a WAH 54 of approximately 1 mm, and the magnet 36 has an MAH 44 of approximately 3 mm for a combined TAH 56 of approximately 4 mm. While in the examples of FIGS. 3, 4, and 5 one or two washers 48 have been shown and described, it should be appreciated that depending on the application, the space constraints, and so forth, more than two or fewer than one washer 48 may be used. In some aspects, the washer 48 is disposed either proximate to the housing 32 or separated from the housing 32 by the magnet 36. In several aspects, multiple washers 48 may be stacked directly against one another without departing from the scope or intent of the present disclosure.

While the MAH 44 has been described above as being either 2 mm or 3 mm, it should be appreciated that depending on the composition of the magnet 36, and depending on the application, the space constraints, and so forth, the magnet 36 may have an MAH 44 that varies substantially from the values mentioned thus far. In one aspect, the magnet 36 may have an MAH 44 in the range of about 1 mm to about 3 mm. In another aspect, the magnet 36 may have an MAH 44 in the range of about 1 mm to about 3.5 mm. Likewise, while the WAH 54 has been described above as 0.5 mm, or 1 mm, it should be appreciated that depending on the composition of the magnet 36, the composition of the washer or washers 48, the application, the space constraints, and so forth, the washer or washers 48 may have a WAH 54 that varies from the values mentioned thus far. In several aspects, the washer or washers 48 may be about ¼ to ¾ of the MAH 44, or about 0.5 mm to about 1.5 mm if the washers 48 are made of steel or similar compounds. In other aspects, the washers 48 may have a WAH 54 of about ¼ mm to ½ mm when the washers 48 are made of mu metals, or the like.

Figure 6:
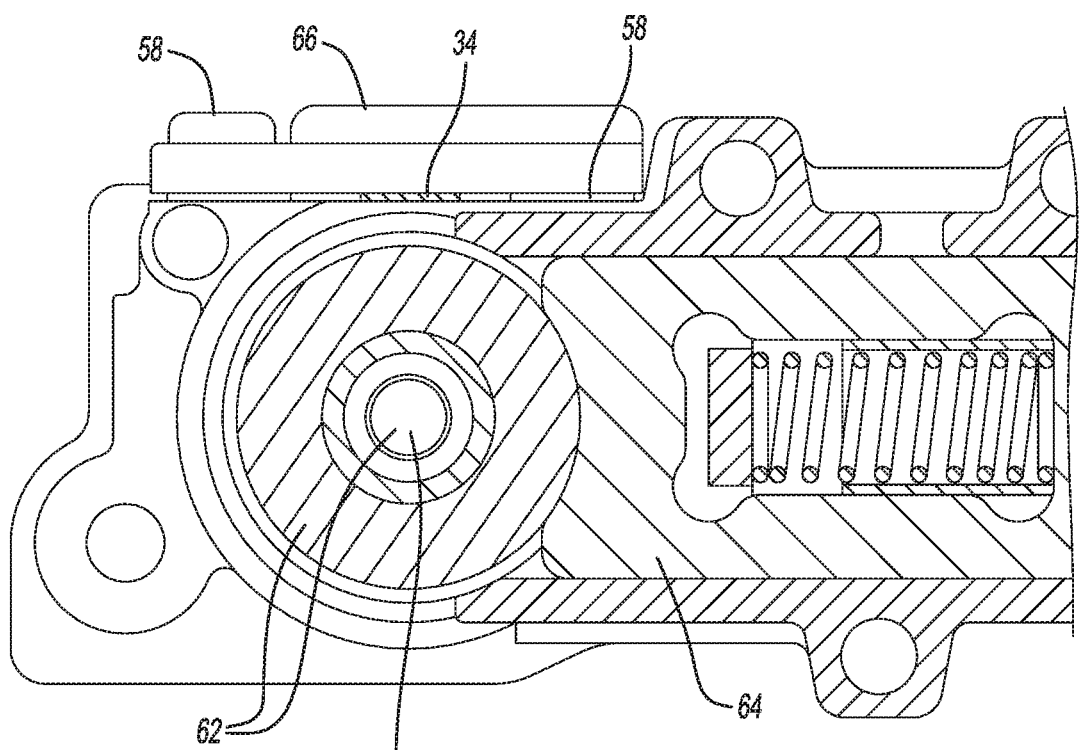
FIG. 6 is a second cross-sectional view of a portion of the ETRS system according to an aspect of the present disclosure.
Figure 7:
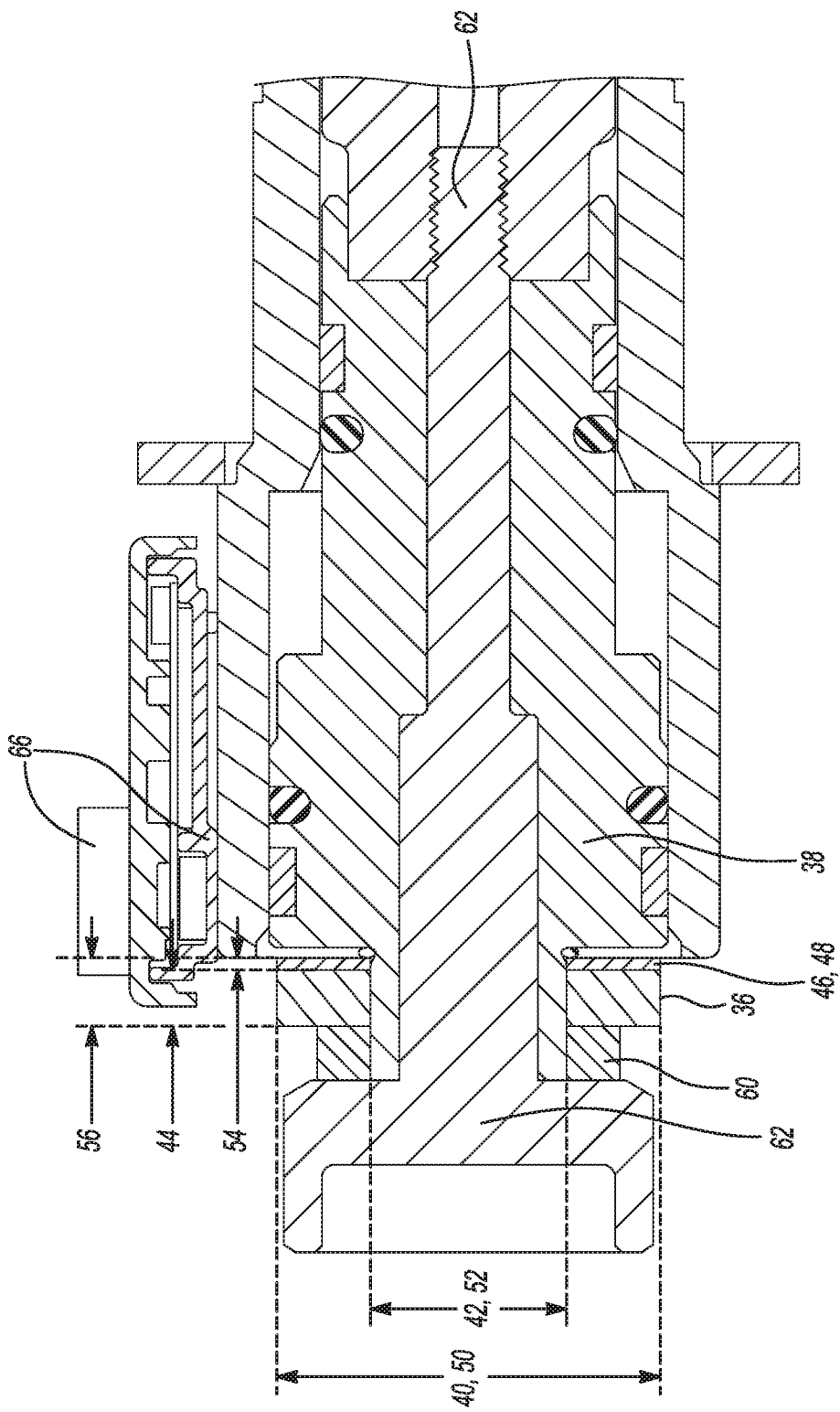
FIG. 7 is a third cross-sectional view of a portion of the ETRS system according to an aspect of the present disclosure.

Turning now to FIGS. 6 and 7, and with continued reference to FIGS. 1-5, another example of a washer 48 in combination with a magnet 36 is shown. In the example of FIGS. 6 and 7 the ETRS position sensor 34 is attached to the housing 32 by attachment features 58. Given the proximity of the attachment features 58 to the magnet 36 and the plate or plates 48, the attachment features 58 can form a portion of a magnetic circuit that alters the magnetic field direction and/or magnetic field strength at various selector shaft 38 positions as the selector shaft 38 is manipulated by the driver. To improve the homogeneity of the magnetic field of the magnet 36, in some examples, the attachment features 58 are made of materials having low magnetic permeability, such as stainless steel or the like. By using materials having low magnetic permeability, but high mechanical strength, the structural and/or mechanical performance of the attachment features 58 is not affected, but magnetic field distortion is dramatically reduced. By reducing the distortion of the magnetic field of the magnet 36, magnetic flux measured by the ETRS position sensor 34 is accurately, precisely, and repeatably measurable at various selector shaft 38 positions. In several aspects additional materials having low magnetic permeability and high mechanical strength are disposed within the ETRS system 30. For example, a spacer plate 60 made of aluminum, copper, brass or other such low magnetic permeability materials separates a ferrous piston and piston bolt 62 on the selector shaft 38 from the magnet 36, thereby reducing distortion of the magnetic field of the magnet 36. In another example, a lock plate 64 disposed within the housing 32 and operable to selectively prevent the piston and piston bolt 62 on the selector shaft 38 from moving is also made of low magnetic permeability materials. As with the attachment features 58, the spacer plate 60, and the piston and piston bolt 62, the lock plate 64 being composed of low magnetic permeability materials reduces distortion of the magnetic field of the magnet 36, thereby improving the accuracy of location measurements taken by the ETRS position sensor 34. Additional low magnetic permeability materials may likewise be used elsewhere in the ETRS system 30 and the housing 32 to reduce magnetic field distortion and improve ETRS position sensor 34 accuracy without departing from the scope or intent of the present disclosure. Moreover, while the attachment features 58 have been depicted as bolts, it should be appreciated that the attachment features 58 may take other forms, such as screws, clips, rivets, slides, tongue-and-groove joints, or the like without departing from the scope or intent of the present disclosure.

Turning now to FIG. 7 in particular, in another example, the magnetic flux is drawn towards the ETRS position sensor 34 by the use of a flux concentrator plate, ring, or shield 66. In several aspects, the flux concentrator plate 66 is a ferrous, magnetically conductive component mounted to the housing 32 proximate to the ETRS position sensor 34. The flux concentrator plate 66 directs magnetic flux towards the ETRS position sensor 34, thereby increasing the magnetic flux at the ETRS position sensor 34 over what would normally be produced by the magnet 36. By using a flux concentrator plate 66 a quantity and strength of the magnetic material used to produce the magnet 36 may be reduced. In an example in which the magnet 36 is sandwiched by two washers 48 each having a WAH 54 of 1.5 mm the magnet 36 is at a minimum MAH 44 of 1 mm. The 1 mm MAH 44 magnet 36 is at a minimum volume, and a minimum mass, and therefore produces a minimal amount of magnetic flux. In the example, the magnet 36 is relatively weak by comparison with larger MAH 44 magnets 36 made of the same magnetic material. Accordingly, in order to direct a maximum quantity of magnetic flux on the ETRS position sensor 34, the flux concentrator plate 66 collects and focuses a portion of the magnetic field and magnetic flux produced by the magnet 36 on the ETRS position sensor 34, thereby increasing the accuracy and precision of the ETRS position sensor 34 readings. In further examples, a magnetic flux shield 68 may be used with the flux concentrator plate 66 and/or high or low magnetic permeability materials placed throughout the ETRS system 30 to improve the accuracy, precision, and repeatability of measurements taken by the ETRS position sensor 34. The magnetic flux shield 68, like the flux concentrator plate 66 is made of ferrous, or otherwise magnetically conductive material strategically placed in, on, or about the ETRS system 30, and in particular proximate the ETRS position sensor 34.

A magnet 36 having robust magnetic field homogeneity and improved signal-to-noise ratios for a transmission 16 ETRS position sensor 34 of the present disclosure offers several advantages. These include the ability to be retrofitted to current and future ETRS systems 30 without additional design changes, thereby maintaining and/or reducing manufacturing costs while reducing weight, improving fuel economy, and improving the precision, accuracy, repeatability, and robustness of ETRS position sensor 34 readings by increasing magnetic field homogeneity.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An electronic transmission range selection (ETRS) system for a motor vehicle transmission comprises:
    an ETRS housing disposed on the transmission, the ETRS housing having a magnetic field sensor in communication with a transmission controller; and
    a magnetic field source comprising a magnet component and a high magnetic permeability component, the magnetic field source disposed on a transmission selector shaft, the magnetic field source detectable by the magnetic field sensor at a plurality of predetermined positions along a movement path of the transmission selector shaft;
    the magnetic field sensor detecting magnetic flux generated by the magnetic field source, and communicating magnetic field source position information to the controller,
    wherein the high magnetic permeability component homogenizes the magnetic flux generated by the magnet component and the controller generates an electronic transmission mode signal based on the magnetic field source position information.

2. The ETRS system of claim 1 wherein the magnetic field sensor is mounted to the ETRS housing by an attachment feature.

3. The ETRS system of claim 2 wherein the attachment feature comprises a bolt, a nut, a stud, a screw, a rivet or a clip.

4. The ETRS system of claim 1 wherein the high magnetic permeability component comprises steel or mu metals.

5. The ETRS system of claim 1 wherein the high magnetic permeability component is disposed axially adjacent to the magnet component.

6. The ETRS system of claim 1 further comprising a flux concentrator plate disposed proximate the magnetic field sensor and concentrating magnetic flux from the magnetic field source on the magnetic field sensor.

7. The ETRS system of claim 1 wherein the magnet component is substantially cylindrical and has a first axial height, a first internal diameter sized to fit around the transmission selector shaft, and a first external diameter sized to fit within a portion of the housing.

8. The ETRS system of claim 7 wherein the high magnetic permeability component comprises at least one of an attachment feature and a substantially cylindrical plate, the substantially cylindrical plate having a second axial height, a second internal diameter larger than or equal to the first internal diameter, and a second external diameter smaller than or equal to the first external diameter.

9. The ETRS system of claim 8 wherein the first axial height is between about 1 and about 7 times the second axial height.

10. The ETRS system of claim 8 wherein the first axial height is between about 1 and about 3 times the second axial height.

11. The ETRS system of claim 8 wherein the first axial height is between about 1 and about 2 times the second axial height.

12. The ETRS system of claim 8 wherein in combination the first axial height and the second axial height are about 4 mm.

13. An electronic transmission range selection (ETRS) system for a motor vehicle transmission comprises:
    an ETRS housing disposed on the motor vehicle transmission, the ETRS housing having a magnetic field sensor in communication with a transmission controller, the magnetic field sensor mounted to the ETRS housing by an attachment feature; and
    a magnetic field source comprising a magnet component and a high magnetic permeability component, the high magnetic permeability component comprising steel or mu metal, the magnetic field source disposed on a transmission selector shaft, the magnetic field source detectable by the magnetic field sensor at a plurality of predetermined positions along a movement path of the transmission selector shaft; and
    wherein the high magnetic permeability component homogenizes the magnetic flux generated by the magnet component, the magnetic field sensor detects magnetic flux generated by the magnetic field source, and communicates magnetic field source position information to the controller, and the controller generates an electronic transmission mode signal based on the magnetic field source position information.

14. The ETRS system of claim 13 wherein the high magnetic permeability component is disposed axially adjacent to the magnet component.

15. The ETRS system of claim 13 further comprising a flux concentrator plate disposed proximate the magnetic field sensor and concentrating magnetic flux from the magnetic field source on the magnetic field sensor.

16. The ETRS system of claim 13 wherein the magnet component is substantially cylindrical and has a first axial height, a first internal diameter sized to fit around the transmission selector shaft, and a first external diameter sized to fit within a portion of the housing.

17. The ETRS system of claim 16 wherein the high magnetic permeability component comprises at least one of the attachment feature and a substantially cylindrical plate, the substantially cylindrical plate having a second axial height, a second internal diameter larger than or equal to the first internal diameter, and a second external diameter smaller than or equal to the first external diameter.

18. The ETRS system of claim 17 wherein the first axial height is selected from a group consisting of: between about 1 and about 7 times the second axial height, between about 1 and about 3 times the second axial height, and between 1 and about 2 times the second axial height.

19. The ETRS system of claim 17 wherein in combination the first axial height and the second axial height are a maximum of about 4 mm.

20. An electronic transmission range selection (ETRS) system for a motor vehicle transmission comprises:
- an ETRS housing disposed on the motor vehicle transmission, the ETRS housing having a magnetic field sensor in communication with a transmission controller, the magnetic field sensor mounted to the ETRS housing by an attachment feature; and
- a magnetic field source comprising a magnet component comprising at least one of Samarium Cobalt (SmCo), Alnico, Ceramic, Ferrite, and Neodymium Iron Boron magnetic materials and a high magnetic permeability component comprising steel or mu metals, the magnetic field source disposed on a transmission selector shaft, the magnetic field source detectable by the magnetic field sensor at a plurality of predetermined positions along a movement path of the transmission selector shaft; and
- a flux concentrator plate disposed proximate the magnetic field sensor and concentrating magnetic flux generated by the magnetic field source on the magnetic field sensor, wherein the magnet component is substantially cylindrical and has a first axial height, a first internal diameter sized to fit around the transmission selector shaft, and a first external diameter sized to fit within a portion of the housing, and wherein the high magnetic permeability component comprises a substantially cylindrical plate, the substantially cylindrical plate having a second axial height, a second internal diameter larger than or equal to the first internal diameter, and a second external diameter smaller than or equal to the first external diameter, the high magnetic permeability component disposed axially adjacent to the magnet component and the first and the second axial heights having a combined axial height of about 4 mm, the high magnetic permeability component homogenizing the magnetic flux generated by the magnet component, the magnetic field sensor detects the magnetic flux generated by the magnetic field source, and communicates magnetic field source position information to the controller, and the controller generates an electronic transmission mode signal based on the magnetic field source position information.

* * * * *